(12) United States Patent
Ikegami et al.

(10) Patent No.: US 8,104,308 B2
(45) Date of Patent: Jan. 31, 2012

(54) REFRIGERANT CYCLE DEVICE WITH EJECTOR

(75) Inventors: Makoto Ikegami, Kariya (JP); Etsuhisa Yamada, Kariya (JP); Haruyuki Nishijima, Obu (JP); Hiroshi Oshitani, Toyota (JP); Yukikatsu Ozaki, Gamagori (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 725 days.

(21) Appl. No.: 12/286,869

(22) Filed: Oct. 2, 2008

(65) Prior Publication Data

US 2009/0090129 A1    Apr. 9, 2009

(30) Foreign Application Priority Data

Oct. 3, 2007    (JP) ................................. 2007-260038

(51) Int. Cl.
*F25B 1/06*    (2006.01)
(52) U.S. Cl. .......................................... 62/500; 62/512
(58) Field of Classification Search .................. 62/500, 62/509, 512, 513, 434; 165/908; 137/246.16, 137/246.21
See application file for complete search history.

(56) References Cited

U.S. PATENT DOCUMENTS

| | | | |
|---|---|---|---|
| 5,343,711 A * | 9/1994 | Kornhauser et al. | 62/116 |
| 5,765,380 A | 6/1998 | Misawa et al. | |
| 6,550,265 B2 | 4/2003 | Takeuchi et al. | |
| 6,729,157 B2 * | 5/2004 | Oshitani et al. | 62/500 |
| 6,829,905 B2 * | 12/2004 | Ohta et al. | 62/500 |
| 6,857,280 B1 * | 2/2005 | Yamanaka et al. | 62/205 |
| 6,862,897 B2 * | 3/2005 | Makida et al. | 62/500 |
| 6,954,074 B2 * | 10/2005 | Zhu et al. | 324/399 |
| 7,178,359 B2 | 2/2007 | Oshitani et al. | |
| 7,252,069 B2 | 8/2007 | Date et al. | |
| 7,254,961 B2 | 8/2007 | Oshitani et al. | |
| 2006/0266072 A1 | 11/2006 | Takeuchi et al. | |

FOREIGN PATENT DOCUMENTS

| | | |
|---|---|---|
| CN | 101008532 | 8/2007 |
| JP | 06-018121 | 1/1994 |
| JP | 07-234024 | 9/1995 |

(Continued)

OTHER PUBLICATIONS

Office action dated Sep. 18, 2009 in corresponding Chinese Application No. 2008 10168933.6.

(Continued)

*Primary Examiner* — Mohammad Ali
(74) *Attorney, Agent, or Firm* — Harness, Dickey & Pierce, PLC (57) ABSTRACT

In a refrigerant cycle device with an ejector, a branch portion is located at an upstream side of a nozzle portion of the ejector so that the refrigerant flowing out of an exterior heat exchanger is branched into first and second streams in a cooling operation mode. A passage switching portion is configured such that the refrigerant of the first stream flows through the nozzle portion of the ejector, and the refrigerant of the second stream flows through the decompression unit, the using-side heat exchanger, and the refrigerant suction port of the ejector, in the cooling operation mode. In contrast, the refrigerant discharged from the compressor flows into the nozzle portion after passing through the using-side heat exchanger, and the refrigerant flowing out of the exterior heat exchanger flows into the refrigerant suction port of the ejector, in the heating operation mode.

13 Claims, 4 Drawing Sheets

FOREIGN PATENT DOCUMENTS

| | | |
|---|---|---|
| JP | 2002-081771 | 3/2002 |
| JP | 2002-327967 | 11/2002 |
| JP | 2003-307357 | 10/2003 |
| JP | 2001-227799 | 8/2004 |
| JP | 2005-037114 | 2/2005 |
| JP | 2005-300067 | 10/2005 |
| JP | 2006-183653 | 7/2006 |
| JP | 2007-003166 | 1/2007 |
| JP | 2007-003171 | 1/2007 |
| JP | 2007-078318 | 3/2007 |
| JP | 2007-078349 | 3/2007 |
| JP | 2007-101159 | 4/2007 |

OTHER PUBLICATIONS

Office action dated Sep. 1, 2009 in corresponding Japanese Application No. 2007-260038.

* cited by examiner

REFRIGERANT CYCLE DEVICE WITH EJECTOR

CROSS REFERENCE TO RELATED APPLICATION

This application is based on Japanese Patent Application No. 2007-260038 filed on Oct. 3, 2007, the contents of which are incorporated herein by reference in its entirety.

FIELD OF THE INVENTION

The present invention relates to a refrigerant cycle device with an ejector.

BACKGROUND OF THE INVENTION

Conventionally, a refrigerant cycle device including an ejector is configured to be switched between a cooling operation mode for cooling a space to be air-conditioned, and a heating operation mode for heating the space to be air-conditioned.

In the refrigerant cycle device including the ejector, a refrigerant flow passage is switched so that the cooling operation mode and the heating operation mode are switched. A using-side heat exchanger in which refrigerant is heat-exchanged with air to be blown into the space to be air-conditioned is operated as an evaporator for evaporating the refrigerant in the cooling operation mode, and the using-side heat exchanger is operated as a refrigerant radiator for radiating heat from the refrigerant in the heating operation mode.

Figure 3:
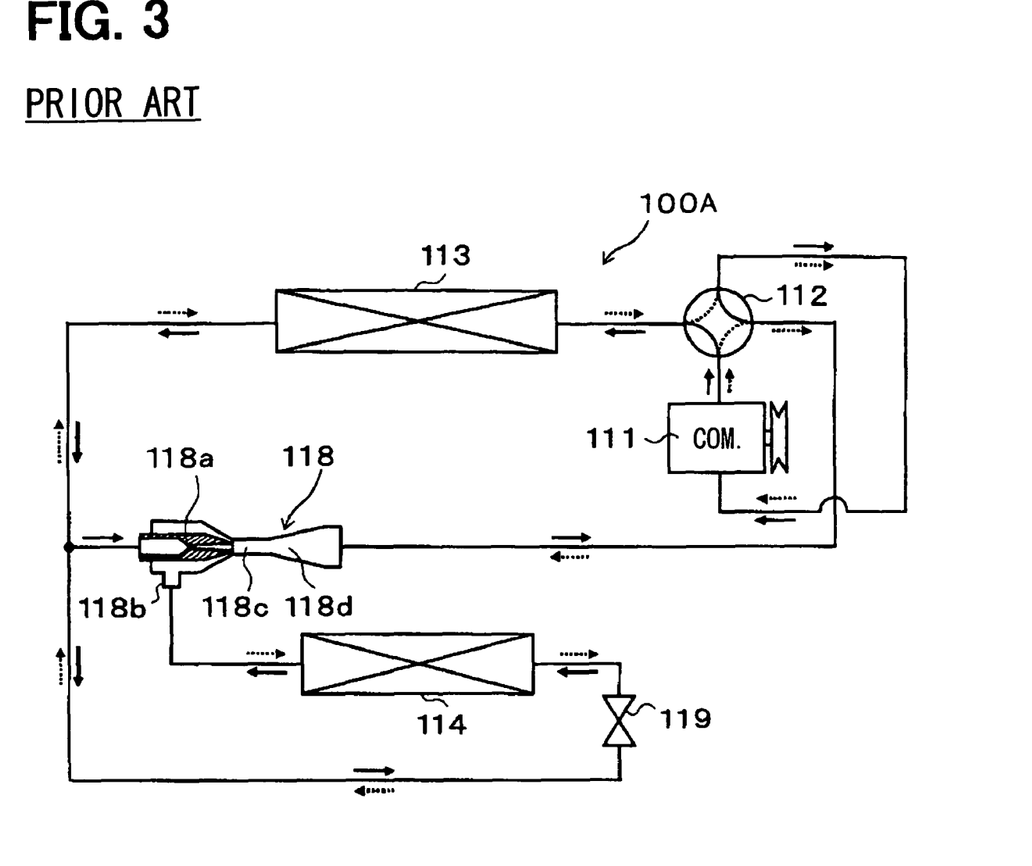
FIG. 3 is a schematic diagram showing a refrigerant cycle device having an ejector in a prior art.

FIG. 3 shows a refrigerant cycle device 100A with an ejector 118, described in JP-A-2007-003171 (corresponding to US 2006/0266072 A1), for example. The refrigerant cycle device 100A is provided with a four-way valve 112 as a passage switching portion. The four-way valve 112 is switched such that refrigerant discharged from the compressor 111 is introduced into an exterior heat exchanger 113 to perform heat exchange with outside air while refrigerant flowing out of a diffuser portion 118d of an ejector 118 is drawn to the compressor 111 in the cooling operation mode. In the cooling operation mode, the refrigerant flows as in the solid arrows in FIG. 3. Therefore, in the cooling operation mode, the refrigerant flowing out of the exterior heat exchanger 113 is branched upstream of a nozzle portion 118a of the ejector 118. A part of refrigerant branched from the branch portion flows into a using-side heat exchanger 114 after passing through a decompression unit 119, and is drawn into a suction port 118b of the ejector 118 by a refrigerant stream jetted from the nozzle portion 118a. The refrigerant jetted from the nozzle portion 118a and the refrigerant drawn from the suction portion 118b are mixed in a mixing portion 118c of the ejector 118, and the mixed refrigerant flows through the diffuser portion 118d of the ejector 118. Therefore, in the cooling operation mode, the using-side heat exchanger 114 is operated as an evaporator.

In contrast, in the heating operation mode, the four-way valve 112 is switched so that the refrigerant flows in the chain arrows in FIG. 3. Therefore, in the heating operation mode, the refrigerant discharged from the compressor 111 is introduced into the ejector 118 from an outlet side of the diffuser portion 118d of the ejector 118, and refrigerant flowing out of the exterior heat exchanger 113 is drawn to the compressor 111. In the heating operation mode, the using-side heat exchanger 114 is operated as a refrigerant radiator.

However, in the refrigerant cycle device 100A of FIG. 3, during the heating operation mode, the refrigerant flows in the ejector 118 conversely as compared with the cooling operation mode, and it is impossible to have a pressure increasing efficiency in the ejector 118. As a result, in the heating operation mode, the coefficient of performance (COP) cannot be improved by using the ejector 118.

Figure 4:
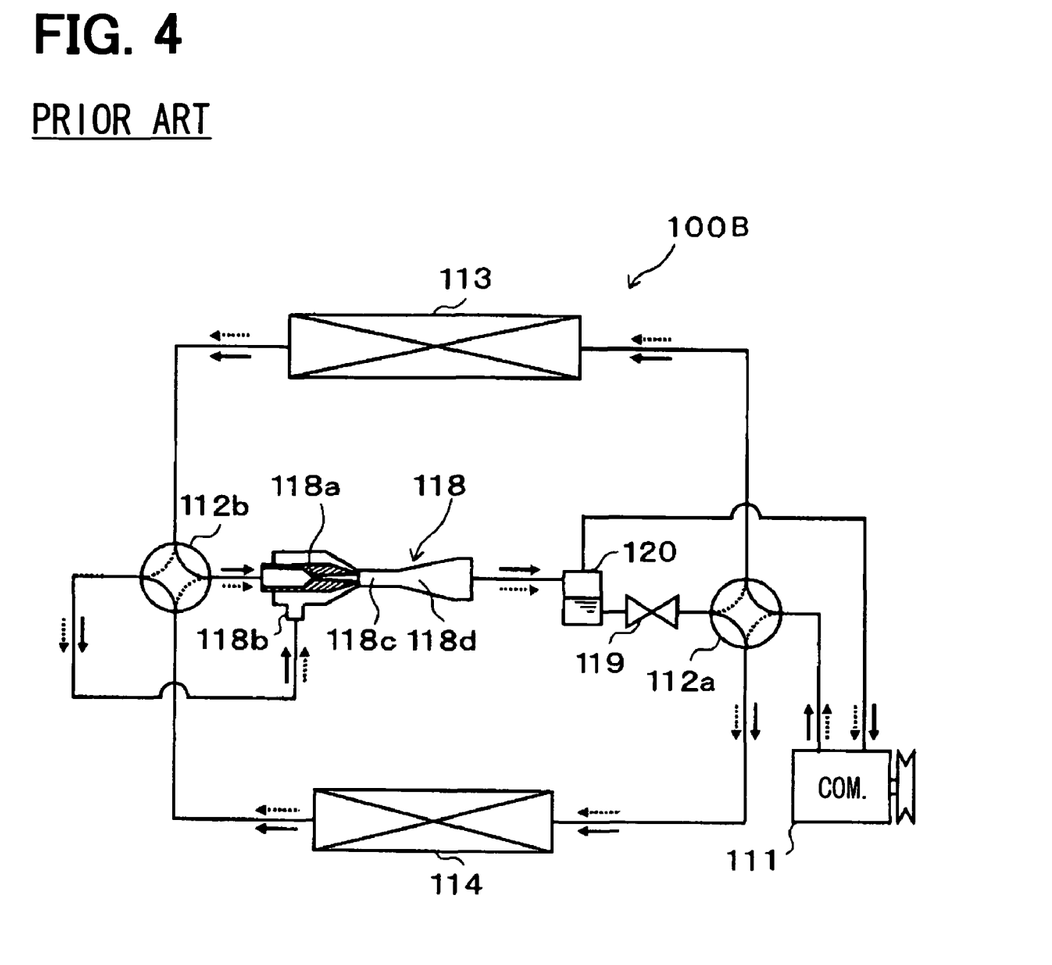
FIG. 4 is a schematic diagram showing a refrigerant cycle device having an ejector in another prior art.

In a refrigerant cycle device 100B with an ejector 118 described in JP-A-2002-327967 (corresponding to U.S. Pat. No. 6,550,265), two four-way valves 112a, 112b are provided as a passage switching portion, as shown in FIG. 4. In FIG. 4, the components similar to those of the refrigerant cycle device 100A of FIG. 3 are indicated by the same reference numbers. The four-way valves 112a, 112b are switched to perform the cooling operation mode or the heating operation mode. In the cooling operation mode, the refrigerant discharged from the compressor 111 flows into the exterior heat exchanger 113, and the refrigerant flowing out of the using-side heat exchanger 114 is drawn into the refrigerant suction port 118b, as in the solid arrows in FIG. 4. Therefore, in the cooling operation mode, the using-side heat exchanger 114 is operated as the evaporator. In FIG. 4, a gas-liquid separator 120 is located at an outlet side of the diffuser portion 118d of the ejector 118.

In contrast, in the heating operation mode, the four-way valves 112a, 112b are switched so that the refrigerant flows in the chain arrows of FIG. 4. Therefore, in the heating operation mode, the refrigerant discharged from the compressor 111 is introduced into the using-side heat exchanger 114 while refrigerant flowing out of the exterior heat exchanger 113 is drawn into the refrigerant suction port 118b of the ejector 118, and thereby the using-side heat exchanger 114 is operated as the refrigerant radiator.

In the refrigerant cycle device 100B of FIG. 4, in both the cooling operation mode and the heating operation mode, high-pressure refrigerant is supplied to the nozzle portion 118a of the ejector 118, and refrigerant flowing out of the heat exchanger operated as the evaporator is drawn into the refrigerant suction port 118b of the ejector 118. In this case, the COP can be improved in both the cooling operation mode and the heating operation mode, because the loss of the kinetic energy of the refrigerant in the nozzle portion 118a can be recovered and the refrigerant pressurized in the diffuser portion 118d is drawn into the compressor 111. However, according to experiments by the inventors of the present application, the space to be air-conditioned cannot be sufficiently cooled in the cooling operation mode although the space to be air-conditioned can be sufficiently heated in the heating operation mode while improving the COP.

The inventors of the present application studied the reasons in detail and found that the cooling operation mode and the heating operation mode have different effects due to the location conditions of the using-side heat exchanger 114 and the exterior heat exchanger 113.

For example, when the refrigerant cycle device 100B is used for a fixed air conditioner for a room, the using-side heat exchanger 114 is generally located at an upper side in the room so that the room can be effectively air-conditioned. Therefore, the using-side heat exchanger 114 is generally located at a position higher than the exterior heat exchanger 113 that is located at exterior. Thus, in the cooling operation mode in which the using-side heat exchanger 114 is operated as the evaporator, it is necessary to move the liquid refrigerant to the using-side heat exchanger 114 located at a position higher than the exterior heat exchanger 113. Furthermore, in the heating operation mode in which the exterior heat exchanger 113 is operated as the evaporator, the ejector 118 is necessary to provide a refrigerant suction effect corresponding to the head difference between the using-side heat exchanger 114 and the exterior heat exchanger 113.

However, in the refrigerant cycle device 100B of FIG. 4, the refrigerant suction capacity of the ejector 118 is approximately equal in both the cooling and heating operation modes, and the liquid refrigerant is supplied to the heat exchanger as the evaporator by only using the suction effect of the ejector 118, thereby causing an insufficient refrigerant suction capacity in the cooling operation mode. As a result, in the cooling operation mode, a sufficient flow amount of the liquid refrigerant cannot be supplied to the using-side heat exchanger 114, and thereby the space to be air-conditioned cannot be sufficiently cooled.

Furthermore, when the refrigerant cycle device 100B is used for a vehicle air conditioner, the compressor 111 and the exterior heat exchanger 113 are located in the engine compartment, while the using-side heat exchanger 114 is located in a passenger compartment.

When the ejector 118 is located in the engine compartment, a refrigerant pipe connecting the ejector 1118 and the using-side heat exchanger 114 becomes longer as compared with a refrigerant pipe connecting the ejector 118 and the exterior heat exchanger 113. As a result, a pressure loss in the refrigerant passage from the gas-liquid separator 120 to the refrigerant suction port 118b via the heat exchanger operated as the evaporator is increased. Thus, the passenger compartment cannot be sufficiently cooled.

SUMMARY OF THE INVENTION

In view of the foregoing problems, it is an object of the present invention to provide a refrigerant cycle device in which a space can be suitably air-conditioned in both a cooling operation mode and a heating operation mode, while improving the coefficient of performance (COP) in both the cooling operation mode and the heating operation mode.

According to an aspect of the present invention, a refrigerant cycle device includes a compressor configured to compress and discharge refrigerant, an exterior heat exchanger located outside of a space to be air-conditioned to perform heat exchange between the refrigerant and outside air, and a using-side heat exchanger located to perform heat exchange between the refrigerant and air to be blown into the space. In the refrigerant cycle device, a passage switching portion is located to switch a refrigerant flow such that the using-side heat exchanger is operated as a refrigerant evaporator in which the refrigerant is evaporated and the exterior heat exchanger is operated as a refrigerant radiator in which the refrigerant is radiated and cooled in a cooling operation mode for cooling the space, and the using-side heat exchanger is operated as the refrigerant radiator and the exterior heat exchanger is operated as the refrigerant evaporator in a heating operation mode for heating the space. The refrigerant cycle device is provided with an ejector that includes a nozzle portion configured to decompress the refrigerant, and a refrigerant suction port from which the refrigerant flowing out of the heat exchanger operated as the evaporator is drawn by a high-speed flow of the refrigerant jetted from the nozzle portion in both the cooling operation mode and the heating operation mode. Furthermore, a branch portion is configured to branch a flow of the refrigerant flowing out of the heat exchanger operated as the refrigerant radiator into first and second streams in one operation mode of the cooling operation mode and the heating operation mode, and a decompression unit is located in a refrigerant passage between the branch portion and the heat exchanger operated as the evaporator, to decompress the refrigerant in the one operation mode.

In the refrigerant cycle device, the passage switching portion is switched to introduce the refrigerant of the first stream branched at the branch portion into the nozzle portion and to introduce the refrigerant of the second stream branched at the branch portion into the refrigerant suction port via the decompression unit and the heat exchanger operated as the evaporator in the one operation mode, and is switched to introduce the refrigerant flowing out of the heat exchanger operated as the radiator into the nozzle portion and to introduce the refrigerant flowing out of the heat exchanger operated as the evaporator into the refrigerant suction port of the ejector in the other one operation mode of the cooling operation mode and the heating operation mode.

In the one operation mode, because the refrigerant of the first stream flows into the nozzle portion, and the refrigerant of the second stream flows into the heat exchanger operated as the evaporator via the decompression unit, it is possible to supply liquid refrigerant to the heat exchanger operated as the evaporator by using both the suction capacity of the ejector and the refrigerant suction and discharge capacity of the compressor.

Accordingly, in any operation mode of the cooling operation mode and the heating operation mode, a sufficient amount of the liquid refrigerant can be supplied to the heat exchanger operated as the evaporator, thereby the space can be suitably air-conditioned. Furthermore, in any operation mode of the cooling operation mode and the heating operation mode, because the refrigerant flowing out of the heat exchanger operated as the evaporator is drawn into the refrigerant suction port of the ejector, the power consumed in the compressor can be reduced, and the COP can be improved.

For example, the refrigerant cycle device may further include an inner heat exchanger that is configured to perform a heat exchange between the refrigerant flowing out of the heat exchanger operated as the refrigerant radiator and the refrigerant to be drawn into the compressor in the one operation mode.

As an example, the one operation mode is the cooling operation mode. In this case, the ejector may be located outside the space, the using-side heat exchanger may be located at an upper side of the exterior heat exchanger, or/and the using-side heat exchanger may have a heat-exchanging capacity that is smaller than that of the exterior heat exchanger.

The refrigerant cycle device may be further provided with a first check valve located in a refrigerant passage through which the refrigerant discharged from the compressor flows into the exterior heat exchanger to allow a flow of the refrigerant from the compressor toward the exterior heat exchanger in the cooling operation mode, a second check valve located in a refrigerant passage between the exterior heat exchanger and the branch portion to allow a flow of the refrigerant from the exterior heat exchanger toward the branch portion, a gas-liquid separator located to separate the refrigerant flowing out of the ejector into gas refrigerant and liquid refrigerant and to introduce the separated gas refrigerant to a refrigerant suction side of the compressor, and a third check valve located in a refrigerant passage through which the separated liquid refrigerant is introduced into the exterior heat exchanger to allow a flow of the refrigerant from the gas-liquid separator to the exterior heat exchanger in the heating operation mode. In this case, the passage switching portion is configured such that the refrigerant discharged from the compressor is introduced into the exterior heat exchanger via the first check valve, the refrigerant flowing out of the exterior heat exchanger is introduced into the branch portion via the second check valve, and the refrigerant flowing out of the using-side heat exchanger is drawn into the refrigerant suction port of the ejector, in the cooling operation mode. Furthermore, the passage switching portion is further configured such that the refrigerant discharged from the compressor is introduced into the using-side heat exchanger, the refrigerant introduced into the exterior heat exchanger via the third check valve is drawn into the refrigerant suction port of the ejector, in the heating operation mode.

According to another aspect of the present invention, a refrigerant cycle device includes a compressor configured to compress and discharge refrigerant, an exterior heat exchanger located outside of a space to be air-conditioned to perform heat exchange between the refrigerant and outside air, and a using-side heat exchanger located to perform heat exchange between the refrigerant and air to be blown into the space. A passage switching portion is located to switch a refrigerant flow such that the using-side heat exchanger is operated as a refrigerant evaporator in which the refrigerant is evaporated and the exterior heat exchanger is operated as a refrigerant radiator in which the refrigerant is radiated and cooled in a cooling operation mode for cooling the space, and the using-side heat exchanger is operated as the refrigerant radiator and the exterior heat exchanger is operated as the refrigerant evaporator in a heating operation mode for heating the space. Furthermore, the refrigerant cycle device is provided with an ejector that includes a nozzle portion configured to decompress the refrigerant, and a refrigerant suction port from which the refrigerant flowing out of the heat exchanger operated as the evaporator is drawn by a high-speed flow of the refrigerant jetted from the nozzle portion in both the cooling operation mode and the heating operation mode. A branch portion is located to branch a flow of the refrigerant flowing out of the exterior heat exchanger into first and second streams in the cooling operation mode, and a decompression unit is located in a refrigerant passage between the branch portion and the using-side heat exchanger to decompress the refrigerant in the cooling operation mode.

In the refrigerant cycle device, the passage switching portion is configured such that the refrigerant of the first stream flows through the nozzle portion of the ejector, and the refrigerant of the second stream flows through the decompression unit, the using-side heat exchanger, and the refrigerant suction port of the ejector, in the cooling operation mode. In addition, the passage switching portion is further configured such that the refrigerant discharged from the compressor flows into the nozzle portion after passing through the using-side heat exchanger, and the refrigerant flowing out of the exterior heat exchanger flows into the refrigerant suction port of the ejector, in the heating operation mode. Accordingly, the space can be suitably air-conditioned in both the cooling operation mode and the heating operation mode, while improving the coefficient of performance (COP) in both the cooling operation mode and the heating operation mode.

For example, the refrigerant cycle device may be further provided with a gas-liquid separator located to separate the refrigerant flowing out of the ejector into gas refrigerant and liquid refrigerant. In this case, the gas-liquid separator may be configured to introduce the separated liquid refrigerant into the exterior heat exchanger in the heating operation mode.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

An embodiment of the present invention will be described with reference to FIGS. 1 and 2. In the present embodiment, a refrigerant cycle device 10 with an ejector 18 is typically used for a vehicle air conditioner. In a cooling operation mode for cooling a space to be air-conditioned, refrigerant flows in the refrigerant cycle device 10 as in the arrows shown in FIG. 1. In contrast, in a heating operation mode for heating the space to be air-conditioned, refrigerant flows in the refrigerant cycle device 10 as in the arrows shown in FIG. 2. In the present embodiment, the space to be air-conditioned is a passenger compartment of the vehicle.

In the refrigerant cycle device 10, a compressor 11 is configured to draw refrigerant, to compress the drawn refrigerant and to discharge the compressed high-pressure and high-temperature refrigerant. The compressor 11 is located in an engine compartment, and is driven and rotated by a drive force from a vehicle engine (not shown) via a pulley and a belt.

As the compressor 11, may be used either a variable displacement compressor for being capable of adjusting a refrigerant discharge capacity by a change in discharge volume, or a fixed displacement compressor for adjusting a refrigerant discharge capacity by changing an operating efficiency of the compressor by intermittent connection of an electromagnetic clutch. When an electric compressor is used as the compressor 11, the compressor 11 can adjust the refrigerant discharge capacity by adjustment of the number of revolutions of an electric motor.

A first four-way valve 12a is connected to a refrigerant discharge side of the compressor 11. The first four-way valve 12a and a second four-way valve 12b are provided to construct a passage switching portion to switch a refrigerant flow between the cooling operation mode and the heating operation mode. The first and second four-way valves 12a, 12b are electrical valves in which its operation is controlled by a control signal from an air-conditioning controller (not shown).

Figure 1:
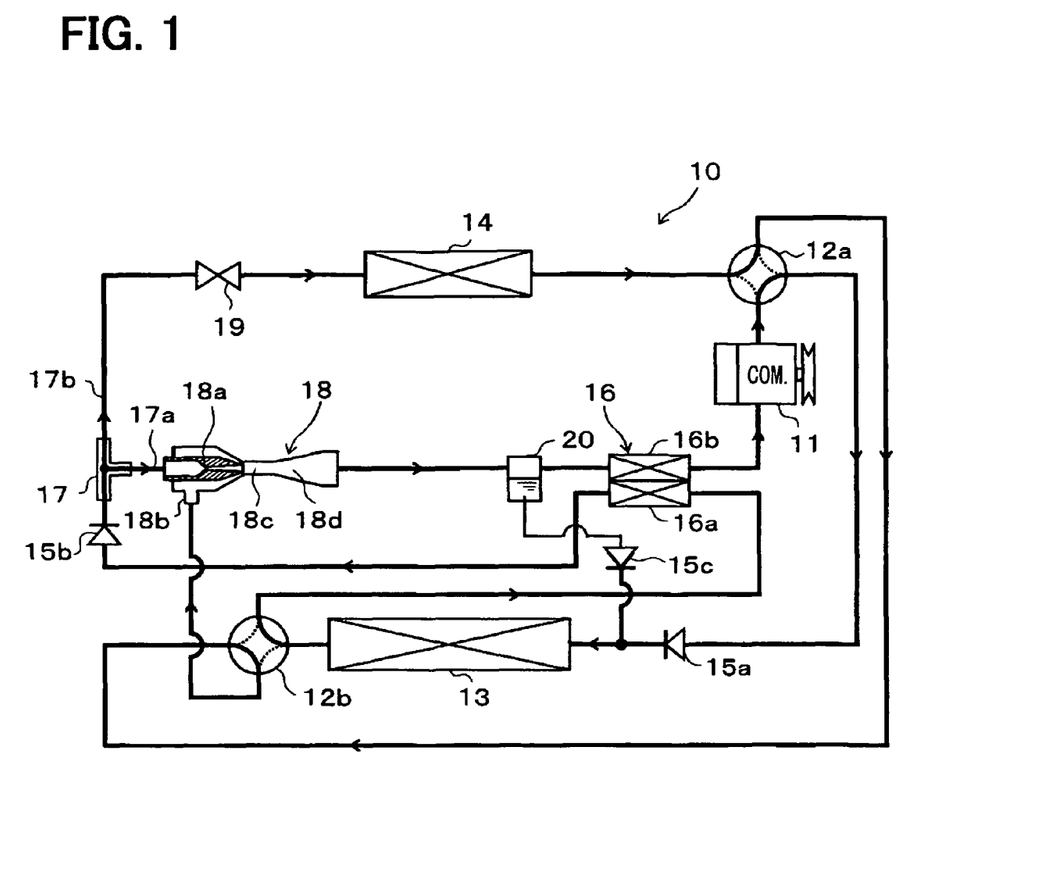
FIG. 1 is a schematic diagram showing a refrigerant cycle device having an ejector in a cooling operation mode, according to an embodiment of the invention.
Figure 2:
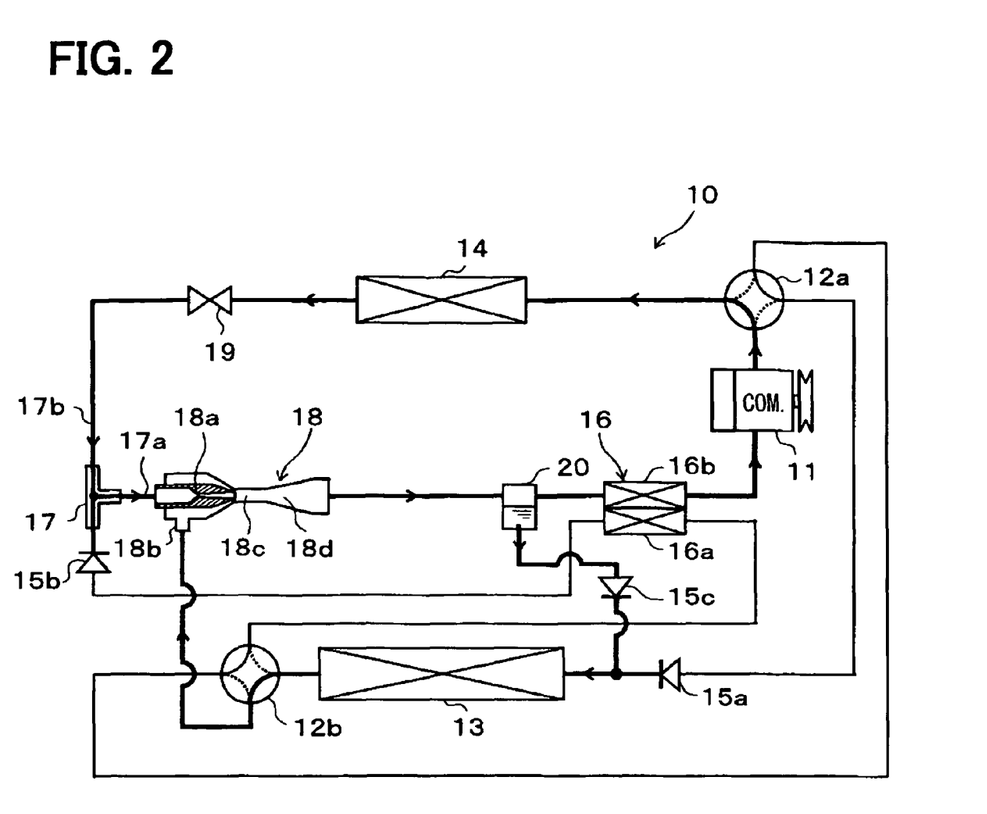
FIG. 2 is a schematic diagram showing the refrigerant cycle device having the ejector in a heating operation mode, according to the embodiment of the invention.

The first four-way valve 12a is provided with refrigerant inlet and outlet which are coupled with one side of the second four-way valve 12b, an exterior heat exchanger 13 and a using-side heat exchanger 14, in addition to the discharge side of the compressor 11, as shown in FIGS. 1 and 2.

When the cooling operation mode is set, the first four-way valve 12a is switched, such that the discharge side of the compressor 11 is coupled to the exterior heat exchanger 13, and the using-side heat exchanger 14 is coupled to a refrigerant suction port 18b of the ejector 18 via the second four-way valve 12b, as shown in FIG. 1. In contrast, when the heating operation mode is set, the first four-way valve 12a is switched, such that the discharge side of the compressor 11 is coupled to the using-side heat exchanger 14, and the exterior heat exchanger 13 is coupled to the refrigerant suction port 18b of the ejector 18 via the second four-way valve 12b, as shown in FIG. 2.

The second four-way valve 12b is provided with refrigerant inlet and outlet which are coupled with the exterior heat exchanger 13, a first refrigerant passage 16a of an inner heat exchanger 16, the refrigerant suction port 18b of the ejector 18, and the first four-way valve 12a.

When the cooling operation mode is set, the second four-way valve 12b is switched, such that the exterior heat exchanger 13 is coupled to the first refrigerant passage 16a of the inner heat exchanger 16, and the first four-way valve 12a is coupled to the refrigerant suction port 18b of the ejector 18, as shown in FIG. 1. Furthermore, when the heating operation mode is set, the second four-way valve 12b is switched, such that the exterior heat exchanger 13 is coupled to the refrigerant suction port 18b of the ejector 18, as shown in FIG. 2.

The exterior heat exchanger 13 is a heat exchanger in which refrigerant is heat-exchanged with outside air (i.e., air outside the passenger compartment) blown by a cooling fan. The exterior heat exchanger 13 is located in the engine compartment, similarly to the compressor 11. A first check valve 15a is located in a refrigerant passage from the first four-way valve 12a to the exterior heat exchanger 13 so as to only allow a refrigerant flow from the four-way valve 12a toward the exterior heat exchanger 13. That is, the first check valve 15a is located to only allow a refrigerant flow from the compressor 11 to the exterior heat exchanger 13 in the cooling operation mode.

The using-side heat exchanger 14 is a heat exchanger in which the refrigerant flowing therein is heat-exchanged with air to be blown into the passenger compartment. Conditioned air temperature-adjusted in the air conditioner is blown into the passenger compartment by a blower fan. Here, the passenger compartment is one example of the space to be air-conditioned.

The using-side heat exchanger 14 is located in the passenger compartment, for example. More specifically, the using-side heat exchanger 14 is disposed in an air conditioning case defining an air passage through which air flows into the passenger compartment. The air conditioning case of the air conditioner is located inside a dashboard (instrument panel) positioned at the front area in the passenger compartment.

In the present embodiment, because the using-side heat exchanger 14 is located in the passenger compartment, it is necessary to form the size of the using-side heat exchanger 14 to be smaller than that of the exterior heat exchanger 13. Generally, the heat-exchanging area of the using-side heat exchanger 14 is made smaller than that of the exterior heat exchanger 13, and thereby the heat-exchanging capacity of the using-side heat exchanger 14 becomes smaller than that of the exterior heat exchanger 13. For example, the cooling fan for blowing air toward the exterior heat exchanger and the blower fan for blowing air into the passenger compartment are electrical fans in which the rotation speed (air blowing amount) is controlled by controlling the voltages output from the air-conditioning controller.

Next, the structure of the refrigerant cycle device 10 according to the present embodiment will be described based on the cooling operation mode of FIG. 1.

The inner heat exchanger 16 includes the first refrigerant passage 16a and a second refrigerant passage 16b. In the cooling operation mode, the refrigerant flowing out of the exterior heat exchanger 13 passes through the first refrigerant passage 16a of the inner heat exchanger 16, and is heat exchanged with the refrigerant passing through the second refrigerant passage 16b of the inner heat exchanger 16. The refrigerant passing through the second refrigerant passage 16b is drawn to the compressor 11. Because the inner heat exchanger 16 is provided, an enthalpy difference between the refrigerant at the refrigerant inlet side of the using-side heat exchanger 14 and the refrigerant at the refrigerant outlet side of the using-side heat exchanger 14 can in increased in the cooling operation mode, thereby improving the coefficient of performance (COP) in the refrigerant cycle device 10.

A branch portion 17 is located at a refrigerant outlet side of the first refrigerant passage 16a of the inner heat exchanger 16 to branch the flow of refrigerant at an upstream side of the nozzle portion 18a of the ejector 18 into first and second streams in the cooling operation mode. A second check valve 15b is located in a refrigerant passage between the first refrigerant passage 16a of the inner heat exchanger 16 and the branch portion 17 to allow a refrigerant flow from the first refrigerant passage 16a to the branch portion 17, in the cooling operation mode. That is, the second check valve 15b is located to allow a refrigerant flow from the exterior heat exchanger 13 to the branch portion 17 in the cooling operation mode.

The branch portion 17 can be constructed with a three-way joint having three ports. The branch passage 17 may be constructed of a rectangular metal block or a resin block having plural refrigerant passages therein.

First and second branch passages 17a, 17b are branched from the branch portion 17. The branch portion 17 is coupled to the nozzle portion 18a of the ejector 18 via the first branch passage 17a. Furthermore, the branch portion 17 is coupled to a decompression unit 19 via the second branch passage 17b. The decompression unit 19 is located upstream of the using-side heat exchanger 14 in the cooling operation mode, to decompress the refrigerant. For example, the decompression unit 19 is a fixed throttle such as a capillary tube or an orifice.

The ejector 18 coupled to the first branch passage 17a is used as a decompression means for decompressing refrigerant, and is also used as a refrigerant circulating means for circulating refrigerant by the suction effect of refrigerant jetted from the nozzle portion 18a at a high speed.

The ejector 10 includes the nozzle portion 18a, the refrigerant suction port 18b, a mixing portion 18c and a diffuser portion 18d. The nozzle portion 18a has a throttled refrigerant passage area in cross section, in which refrigerant is decompressed and expanded in isentropic. The refrigerant suction port 18b is provided in the ejector 18 to communicate with a refrigerant jet port of the nozzle portion 18a in the ejector 18. Therefore, in the cooling operation mode, the refrigerant from the using-side heat exchanger 14 is drawn by the refrigerant jet flow from the refrigerant jet port of the nozzle portion 18a into the refrigerant suction port 18b via the first and second four-way valves 12a, 12b.

The refrigerant jetted from the refrigerant jet port of the nozzle portion 18a and the suction refrigerant drawn from the refrigerant suction port 18b are mixed in the mixing portion 18c, and are pressurized in the diffuser portion 18d.

The diffuser portion 18d has a refrigerant passage area that gradually becomes larger as toward downstream. The diffuser portion 18d has a function for increasing a refrigerant pressure by decelerating a flow speed of the refrigerant, that is, has a function for converting a speed energy of the refrigerant to a pressure energy of the refrigerant. The ejector 18 is generally located outside the space to be air-conditioned. For example, the ejector 18 is located in the engine compartment near the exterior heat exchanger 13, than the using side heat exchanger 14.

An accumulator 20 is located at a refrigerant outlet side of the diffuser portion 18d of the ejector 18. The accumulator 20 is a gas-liquid separator in which the refrigerant flowing out of the diffuser portion 18d of the ejector 18 is separated into gas refrigerant and liquid refrigerant, and surplus refrigerant of the refrigerant cycle is stored therein. The accumulator 20 has a gas refrigerant outlet and a liquid refrigerant outlet. The gas refrigerant outlet of the accumulator 20 is coupled to the refrigerant suction side of the compressor 11 via the second refrigerant passage 16b of the inner heat exchanger 16

The liquid refrigerant outlet of the accumulator 20 is coupled to a refrigerant passage between the first check valve 15a and the exterior heat exchanger 13. A third check valve 15c is configured to only allow a refrigerant flow from the liquid refrigerant outlet of the accumulator 20 toward the exterior heat exchanger 13, in the heating operation mode.

Next, the operation of the refrigerant cycle device 10 according to the present embodiment will be described. First, the cooling operation mode for cooling the passenger compartment will be now described with reference to FIG. 1.

When the cooling operation mode is set, the first and second four-way valves 12a, 12b are controlled to be switched to the positions corresponding to the cooling operation mode so that refrigerant flows as in the arrows of FIG. 1.

Thus, when the compressor 11 is driven and rotated by the vehicle engine, high-temperature and high-pressure refrigerant discharged from the compressor 11 flows into the exterior heat exchanger 13 via the first check valve 15a. Because the third check valve 15c is located, the third check valve 15c prevents the refrigerant flowing from the exterior heat exchanger 13 toward the accumulator 20.

The high-temperature and high-pressure refrigerant flowing into the exterior heat exchanger 13 is cooled by performing heat exchange with outside air blown by the cooling fan. Therefore, in the cooling operation mode, the exterior heat exchanger 13 is operated as a refrigerant radiator.

The high-pressure refrigerant cooled at the exterior heat exchanger 13 flows into the first refrigerant passage 16a of the inner heat exchanger 16 via the second four-way valve 12b, and is heat exchanged with a low-pressure and low-temperature refrigerant passing through the second refrigerant passage 16b. Therefore, the enthalpy of the refrigerant passing through the first refrigerant passage 16a of the inner heat exchanger 16 is reduced by performing heat exchange with the refrigerant to be drawn to the refrigerant suction side of the compressor 11. The refrigerant flowing out of the first refrigerant passage 16a of the inner heat exchanger 16 flows into the branch portion 17 via the second check valve 15b.

Refrigerant branched at the branch portion 17 flows into the first branch passage 17a and the second branch passage 17b. The refrigerant flowing into the first branch passage 17a is decompressed and expanded by the nozzle portion 18a of the ejector 18 in isentropic. In the refrigerant decompression and expansion of the nozzle portion 18a of the ejector 18, the pressure energy of the refrigerant is converted to the speed energy of the refrigerant, thereby a high-speed refrigerant is jetted from the refrigerant jet port of the nozzle portion 18a.

The refrigerant flowing out of the using-side heat exchanger 14 is drawn into the refrigerant suction port 18b of the ejector 18 through the first and second four-way valves 12a, 12b by the suction effect of the refrigerant jetted from the nozzle portion 18a. The refrigerant jetted from the nozzle portion 18a and the refrigerant drawn from the refrigerant suction port 18b are mixed in the mixing portion 18c of the ejector 18, and the mixed refrigerant flows into the diffuser portion 18d.

Because the inner passenger sectional area of the diffuser portion 18d is enlarged as toward the downstream side of the ejector 18, the refrigerant pressure is increased in the diffuser portion 18d by converting the speed energy of the refrigerant to the pressure energy of the refrigerant. The refrigerant flowing out of the diffuser portion 18d of the ejector 18 is separated into gas refrigerant and liquid refrigerant in the accumulator 20. The separated gas refrigerant flowing out of the accumulator 20 flows into the second refrigerant passage 16b of the inner heat exchanger 16, is heat-exchanged with the high-pressure and high-temperature refrigerant passing through the first refrigerant passage 16a of the inner heat exchanger 16, and is drawn into the refrigerant suction port of the compressor 11.

In the cooling operation mode, because the pressure of liquid refrigerant stored in the accumulator 20 is lower than the pressure on the side of the exterior heat exchanger 13, the liquid refrigerant in the accumulator 20 does not flow toward the exterior heat exchanger 13 via the third check valve 15c.

In contrast, the refrigerant flowing toward the second branch passage 17b from the branch portion 17 is decompressed and expanded in the decompression unit 19 in isentropic, and the low-pressure refrigerant decompressed in the decompression unit 19 flows into the using-side heat exchanger 14. The low-pressure refrigerant flowing into the using-side heat exchanger 14 is evaporated by absorbing heat from air to be blown into the passenger compartment. Thus, the air blown by the blower fan into the passenger compartment is cooled by the using-side heat exchanger 14. Therefore, in the cooling operation mode, the using-side heat exchanger 14 is operated as an evaporator for evaporating the refrigerant.

The refrigerant flowing out of the using-side heat exchanger 14 is drawn into the ejector 18 from the refrigerant suction port 18b, via the first four-way valve 12a and the second four-way valve 12b.

Next, the heating operation mode for performing the heating operation in the passenger compartment by using the using-side heat exchanger 14 will be described.

When the heating operation mode is set, the first and second four-way valves 12a, 12b are switched so that refrigerant flows in the arrows shown in FIG. 2. Thus, high-temperature and high-pressure refrigerant discharged from the compressor 11 flows into the using-side heat exchanger 14, and is cooled by performing heat exchange with air to be blown by the blower fan into the passenger compartment. Therefore, air to be blown into the passenger compartment is heated by the using-side heat exchanger 14. Thus, in the heating operation mode, the using-side heat exchanger 14 is operated as a refrigerant radiator in which refrigerant is radiated and cooled.

The high-pressure refrigerant cooled in the using-side heat exchanger 14 flows into the second branch passage 17b, and is decompressed and expanded to a middle pressure by the decompression unit 19 (e.g., fixed throttle). The refrigerant decompressed at the decompression unit 19 flows into the first branch passage 17a via the branch portion 17. Because the second check valve 15b is provided, the refrigerant in the branch portion 17 only flows into the first branch passage 17a without flowing into the first refrigerant passage 16a of the inner heat exchanger 16.

The middle-pressure refrigerant flowing into the first branch passage 17a is further decompressed and expanded in the nozzle portion 18a of the ejector 18 in isenthalpic. Thus, refrigerant is jetted by a high speed from the refrigerant jet port of the nozzle portion 18a, similarly to the cooling operation mode. By the suction effect of the refrigerant flow jetted from the nozzle portion 18a, the refrigerant flowing out of the exterior heat exchanger 13 is drawn into the refrigerant suction port 18b via the second four-way valve 12b.

Thus, in the heating operation mode, the refrigerant jetted from the nozzle portion 18a and the refrigerant drawn from the refrigerant suction port 18b are mixed in the mixing portion 18c of the ejector 18, and pressurized in the diffuser portion 18d. The refrigerant flowing out of the diffuser portion 18d flows into the accumulator 20, and gas refrigerant separated from the liquid refrigerant in the accumulator 20 flows through the second refrigerant passage 16b of the inner heat exchanger 16, and is drawn to the refrigerant suction port of the compressor 11. In the heating operation mode, the refrigerant flows through the second refrigerant passage 16b of the inner heat exchanger 16 substantially without performing a heat exchange.

In contrast, the liquid refrigerant of the accumulator 20 flows by the suction effect of the ejector 18 into the exterior heat exchanger 13 via the third check valve 15c. The liquid refrigerant flowing into the exterior heat exchanger 13 is evaporated by absorbing heat from outside air blown by the cooling fan. Therefore, in the heating operation mode, the exterior heat exchanger 13 is operated as an evaporator for evaporating the refrigerant.

In the heating operation mode, the first check valve 15a is configured to prevent a refrigerant flow from the exterior heat exchanger 13 toward the second check valve 15b. Thus, in the heating operation mode, the refrigerant does not circulate in a refrigerant passage of the second check valve 15b→the first refrigerant passage 16a of the inner heat exchanger 16→the second four-way valve 12b→the first four-way valve 12a→the first check valve 15a. Thus, the inner heat exchanger 16 does not perform substantially a heat exchange during the heating operation mode.

In the refrigerant cycle device 10 of the present embodiment, the ejector 18 is located in the engine compartment except for the space to be air-conditioned, the length of the refrigerant passage (pipe) between the ejector 18 and the using-side heat exchanger 14 becomes longer than the length of the refrigerant passage (pipe) between the ejector 18 and the exterior heat exchanger 13.

Thus, the pressure loss, caused while the refrigerant flowing out of the using-side heat exchanger 14 is drawn into the ejector 18 from the refrigerant suction port 18b during the cooling operation mode, becomes larger than the pressure loss, caused while the refrigerant flowing out of the exterior heat exchanger 13 is drawn into the ejector 18 from the refrigerant suction port 18b during the heating operation mode. Therefore, in the cooling operation mode, the liquid refrigerant is difficult to be supplied to the heat exchanger operated as the evaporator, as compared with the heating operation mode.

Furthermore, because the using-side heat exchanger 14 is mounted in a limit space of the passenger compartment, the heat exchange capacity of the using-side heat exchanger 14 is generally smaller than that of the exterior heat exchanger 13.

However, in the present embodiment, the first and second four-way valves 12a, 12b are switched as described above to selectively set the cooling operation mode or the heating operation mode. Thus, in the cooling operation mode, the liquid refrigerant can be supplied to the using-side heat exchanger 14 by using not only the suction effect of the ejector 18 but also the refrigerant suction and discharge effect of the compressor 11. Therefore, in the cooling operation mode where the liquid refrigerant is difficult to be supplied to the using-side heat exchanger 14, the liquid refrigerant can be sufficiently supplied to the using-side heat exchanger 14, thereby improving the cooling capacity of the using-side heat exchanger.

As a result, even in the cooling operation mode, the cooling for the space to be air-conditioned can be suitably performed. Therefore, both the cooling operation mode and the heating operation mode can be suitably performed. Furthermore, in any operation modes, the refrigerant flowing out of the heat exchanger 13, 14 operated as the evaporator is drawn into the ejector 18 from the refrigerant suction port 18b, and then flows toward the refrigerant suction side of the compressor 11. Thus, in both the cooling operation mode and the heating operation mode, the COP of the refrigerant cycle can be improved.

Furthermore, the inner heat exchanger 16 is provided such that the refrigerant flowing out of the exterior heat exchanger 13 is heat exchanged with suction refrigerant to be drawn into the compressor 11 in the cooling operation mode. Accordingly, even when the heat exchanging capacity of the using-side heat exchanger 14 is smaller than the heat-exchanging capacity of the exterior heat exchanger 13, the cooling capacity of the using-side heat exchanger 14 can be increased in the cooling operation mode, and thereby the space to be air-conditioned can be effectively cooled in the cooling operation mode.

Other Embodiments

Although the present invention has been fully described in connection with the preferred embodiment thereof with reference to the accompanying drawings, it is to be noted that various changes and modifications will become apparent to those skilled in the art.

(1) For example, in the above-described embodiment, the refrigerant cycle device 10 is typically used for a vehicle air conditioner. However, the refrigerant cycle device 10 may be used for a fixed air conditioner fixed to a room, or may be used for a fixed cool storage device, or the like.

When the refrigerant cycle device 10 is used for the fixed air conditioner or a fixed cool storage device, the using-side heat exchanger 14 may be located at an upper side of the exterior heat exchanger 13, and the liquid refrigerant may be difficult to be supplied to the using-side heat exchanger 14 in the cooling operation mode due to the head difference between the using-side heat exchanger 14 and the exterior heat exchanger 13. Even in this case, because the liquid refrigerant is supplied to the using-side heat exchanger 14 by using not only the suction effect of the ejector 18 but also the refrigerant suction and discharge effect of the compressor 11, a sufficient amount of the liquid refrigerant can be supplied to the using-side heat exchanger 14 in the cooling operation mode.

As a result, the space to be air-conditioned can be suitably and effectively cooled and heated with high COP in any the cooling operation mode and the heating operation mode.

(2) In the above-described embodiment, any refrigerant generally known may be used for the refrigerant cycle device 10. For example, flon-based refrigerant, HC-based refrigerant, carbon dioxide or the like may be used for the refrigerant cycle device 10. The refrigerant pressure on a high-pressure side in the refrigerant cycle device 10 may be higher than the critical pressure of the refrigerant.

(3) In the above-described embodiment, the decompression unit 19 is not limited to a fixed throttle, and the other decompression structure may be used as the decompression unit 19. For example, the decompression unit 19 may be a thermal expansion valve in which a valve open degree is mechanically adjusted so that the refrigerant to be drawn to the compressor 11 is in a predetermined super-heating degree. In this case, the accumulator 20 may be omitted.

Alternatively, a gas-liquid separator may be located upstream of the nozzle portion 18a of the ejector 18 in a refrigerant flow.

(4) In the above-described embodiment, the first and second four-way valves 12a, 12b are used as the passage switching portion in the refrigerant cycle device 10. However, the other valve structures may be used as the passage switching portion when the cooling operation mode and the heating operation mode described in the above-embodiment can be selectively switched in the refrigerant cycle device 10. For example, two three-way valves may be combined to have the function of any one of the first and second four-way valves 12a, 12b.

Furthermore, instead of the first and second four-way valves 12a, 12b, electromagnetic valves may be used. For example, four electromagnetic valves may be located in the refrigerant cycle device 10 so that the cooling operation mode and the heating operation mode described in the above embodiment can be selectively set. The electromagnetic valves may be electrically switching valves, for example. By using the electromagnetic valves, the same effects as that in the above-described embodiment can be obtained.

Alternatively, instead of one of the first and second four-way valves 12a, 12b, electromagnetic valves may be used so that the cooling operation mode and the heating operation mode can be selectively set in the refrigerant cycle device 10

(5) In the above-described embodiment, the branch portion 17 is constructed of the three-way joint. However, an electrically operated three-way valve may be used as the branch portion 17. In this case, in the cooling operation mode, all the three ports of the three-way valve as the branch portion 17 are opened. In contrast, in the heating operation mode, two ports of the three-way valve as the branch portion 17 are opened, and one port thereof connected to the inner heat exchanger 16 is closed. When the three-way valve is used as the branch portion 17, the check valve 15b may be omitted.

(6) In the above-described embodiment, instead of at least one of the first to third check valves 15a, 15b, 15c, an electromagnetic valve may be used. That is, if the cooling operation mode and the heating operation mode can be selectively set in the refrigerant cycle device 10, the passage switching structures such as the four-way valves 12a, 12b, the check valves 15a, 15b, 15c, and the branch portion 17 may be suitably changed.

Furthermore, the second check valve 15b and the branch portion 17 may be integrated as one unit, or the second check valve 15b and the inner heat exchanger 16 may be integrated as one unit.

(7) In the above-described embodiment, the refrigerant cycle device 10 is configured such that the liquid refrigerant is supplied to the using-side heat exchanger 14 by using the suction effect of the ejector 18 and the compression and discharge effect of the compressor 11 during the cooling operation mode. However, the refrigerant cycle device 10 can be configured such that the liquid refrigerant is supplied to the exterior heat exchanger 13 by using the suction effect of the ejector 18 and the compression and discharge effect of the compressor 11 during the heating operation mode.

The refrigerant cycle device 10 can be configured such that the liquid refrigerant is supplied to the heat exchanger (13, 14) operated as the evaporator, by using the suction effect of the ejector 18 and the compression and discharge effect of the compressor 11 during one operation mode of the cooling operation mode and the heating operation mode.

For example, the passage switching portion (12a, 12b) is switched to introduce the refrigerant of the first stream branched at the branch portion 17 into the nozzle portion 18a and to introduce the refrigerant of the second stream branched at the branch portion 17 into the refrigerant suction port 18b via the decompression unit 19 and the heat exchanger (13, 14) operated as the evaporator in the one operation mode. Furthermore, the passage switching portion (12a, 12b) is switched to introduce the refrigerant flowing out of the heat exchanger (13, 14) operated as the radiator into the nozzle portion 18a and to introduce the refrigerant flowing out of the heat exchanger (13, 14) operated as the evaporator into the refrigerant suction port 18b in the other one operation mode of the cooling operation mode and the heating operation mode.

In the above-described embodiment, the using-side heat exchanger 14 may be directly located in the space to be air-conditioned, or may be located outside of the space to be air conditioned such that air cooled or heated in the using-side heat exchanger 14 flows into the space to be air-conditioned.

In the above-described embodiment, at least one of the inner heat exchanger 16 and the accumulator 20 may be omitted from the refrigerant cycle device 10.

Such changes and modifications are to be understood as being within the scope of the present invention as defined by the appended claims.

What is claimed is:

1. A refrigerant cycle device comprising:
   a compressor configured to compress and discharge refrigerant;
   an exterior heat exchanger located outside of a space to be air-conditioned, to perform heat exchange between the refrigerant and outside air;
   a using-side heat exchanger located to perform heat exchange between the refrigerant and air to be blown into the space;
   a passage switching portion located to switch a refrigerant flow such that the using-side heat exchanger is operated as a refrigerant evaporator in which the refrigerant is evaporated and the exterior heat exchanger is operated as a refrigerant radiator in which the refrigerant is radiated and cooled in a cooling operation mode for cooling the space, and the using-side heat exchanger is operated as the refrigerant radiator and the exterior heat exchanger is operated as the refrigerant evaporator in a heating operation mode for heating the space;
   an ejector that includes a nozzle portion configured to decompress the refrigerant, and a refrigerant suction port from which the refrigerant flowing out of the heat exchanger operated as the evaporator is drawn by a high-speed flow of the refrigerant jetted from the nozzle portion in both the cooling operation mode and the heating operation mode;
   a branch portion configured to branch a flow of the refrigerant flowing out of the heat exchanger operated as the refrigerant radiator into first and second streams in one operation mode of the cooling operation mode and the heating operation mode;
   a decompression unit located in a refrigerant passage between the branch portion and the heat exchanger operated as the evaporator, to decompress the refrigerant in the one operation mode;
   a first check valve located in a refrigerant passage through which the refrigerant discharged from the compressor flows into the exterior heat exchanger to allow a flow of the refrigerant from the compressor toward the exterior heat exchanger in the cooling operation mode;
   a second check valve located in a refrigerant passage between the exterior heat exchanger and the branch portion to allow a flow of the refrigerant from the exterior heat exchanger toward the branch portion;

a gas-liquid separator located to separate the refrigerant flowing out of the elector into gas refrigerant and liquid refrigerant and to introduce the separated gas refrigerant to a refrigerant suction side of the compressor; and a third check valve located in a refrigerant passage through which the separated liquid refrigerant is introduced into the exterior heat exchanger to allow a flow of the refrigerant from the gas-liquid separator to the exterior heat exchanger in the heating operation mode; wherein the passage switching portion is switched to introduce the refrigerant of the first stream branched at the branch portion into the nozzle portion and to introduce the refrigerant of the second stream branched at the branch portion into the refrigerant suction port via the decompression unit and the heat exchanger operated as the evaporator in the one operation mode, and is switched to introduce the refrigerant flowing out of the heat exchanger operated as the radiator into the nozzle portion and to introduce the refrigerant flowing out of the heat exchanger operated as the evaporator into the refrigerant suction port in the other one operation mode of the cooling operation mode and the heating operation mode;

the passage switching portion is configured such that the refrigerant discharged from the compressor is introduced into the exterior heat exchanger via the first check valve, the refrigerant flowing out of the exterior heat exchanger is introduced into the branch portion via the second check valve, and the refrigerant flowing out of the using-side heat exchanger is drawn into the refrigerant suction port of the ejector, in the cooling operation mode, and the passage switching portion is further configured such that the refrigerant discharged from the compressor is introduced into the using-side heat exchanger, the refrigerant introduced into the exterior heat exchanger via the third check valve is drawn into the refrigerant suction port of the ejector, in the heating operation mode.

2. The refrigerant cycle device according to claim 1, further comprising
an inner heat exchanger configured to perform a heat exchange between the refrigerant flowing out of the heat exchanger operated as the radiator and the refrigerant to be drawn into the compressor in the one operation mode.

3. The refrigerant cycle device according to claim 1, wherein the one operation mode is the cooling operation mode.

4. The refrigerant cycle device according to claim 1, wherein the ejector is located outside the space.

5. The refrigerant cycle device according to claim 1, wherein the using-side heat exchanger is located at an upper side of the exterior heat exchanger.

6. The refrigerant cycle device according to claim 1, wherein the using-side heat exchanger has a heat-exchanging capacity that is smaller than that of the exterior heat exchanger.

7. A refrigerant cycle device comprising:
a compressor configured to compress and discharge refrigerant;
an exterior heat exchanger located outside of a space to be air-conditioned, to perform heat exchange between the refrigerant and outside air;
a using-side heat exchanger located to perform heat exchange between the refrigerant and air to be blown into the space;
a passage switching portion located to switch a refrigerant flow such that the using-side heat exchanger is operated as a refrigerant evaporator in which the refrigerant is evaporated and the exterior heat exchanger is operated as a refrigerant radiator in which the refrigerant is radiated and cooled in a cooling operation mode for cooling the space, and the using-side heat exchanger is operated as the refrigerant radiator and the exterior heat exchanger is operated as the refrigerant evaporator in a heating operation mode for heating the space;
an ejector that includes a nozzle portion configured to decompress the refrigerant, and a refrigerant suction port from which the refrigerant flowing out of the heat exchanger operated as the evaporator is drawn by a high-speed flow of the refrigerant jetted from the nozzle portion in both the cooling operation mode and the heating operation mode;
a branch portion configured to branch a flow of the refrigerant flowing out of the exterior heat exchanger into first and second streams in the cooling operation mode;
a decompression unit located in a refrigerant passage between the branch portion and the using-side heat exchanger to decompress the refrigerant in the cooling operation mode; and
a gas-liquid separator located to separate the refrigerant flowing out of the elector into gas refrigerant and liquid refrigerant, wherein
the passage switching portion is configured such that the refrigerant of the first stream flows through the nozzle portion of the ejector, and the refrigerant of the second stream flows through the decompression unit, the using-side heat exchanger, and the refrigerant suction port of the ejector, in the cooling operation mode;
the passage switching portion is further configured such that the refrigerant discharged from the compressor flows into the nozzle portion after passing through the using-side heat exchanger, and the refrigerant flowing out of the exterior heat exchanger flows into the refrigerant suction port of the ejector, in the heating operation mode; and
the gas-liquid separator is configured to introduce the separated liquid refrigerant into the exterior heat exchanger in the heating operation mode.

8. A refrigerant cycle device comprising:
a compressor configured to compress and discharge refrigerant;
an exterior heat exchanger located outside of a space to be air-conditioned, to perform heat exchange between the refrigerant and outside air;
a using-side heat exchanger located to perform heat exchange between the refrigerant and air to be blown into the space;
a passage switching portion located to switch a refrigerant flow such that the using-side heat exchanger is operated as a refrigerant evaporator in which the refrigerant is evaporated and the exterior heat exchanger is operated as a refrigerant radiator in which the refrigerant is radiated and cooled in a cooling operation mode for cooling the space, and the using-side heat exchanger is operated as the refrigerant radiator and the exterior heat exchanger is operated as the refrigerant evaporator in a heating operation mode for heating the space;
an ejector that includes a nozzle portion configured to decompress the refrigerant, and a refrigerant suction port from which the refrigerant flowing out of the heat exchanger operated as the evaporator is drawn by a high-speed flow of the refrigerant jetted from the nozzle portion in both the cooling operation mode and the heating operation mode;
a branch portion configured to branch a flow of the refrigerant flowing out of the heat exchanger operated as the refrigerant radiator into first and second streams in one operation mode of the cooling operation mode and the heating operation mode;
a decompression unit located in a refrigerant passage between the branch portion and the heat exchanger operated as the evaporator, to decompress the refrigerant in the one operation mode, and
a gas-liquid separator located to separate the refrigerant flowing out of the ejector into gas refrigerant and liquid refrigerant, wherein
the passage switching portion is switched to cause the refrigerant discharged from the compressor to be introduced into the exterior heat exchanger, to cause the refrigerant flowing out of the exterior heat exchanger into the branch portion, to introduce the refrigerant of the first stream branched at the branch portion into the nozzle portion and to introduce the refrigerant of the second stream branched at the branch portion into the refrigerant suction port of the ejector via the decompression unit and the heat exchanger operated as the evaporator in the one operation mode; and
the passage switching portion is switched to cause the refrigerant discharged from the compressor to be introduced into the using-side heat exchanger and to cause the refrigerant flowing out of the using-side heat exchanger into the nozzle portion without being branched at the branch portion, and at the same time, to cause the liquid refrigerant separated at the gas-liquid separator to be introduced into the exterior heat exchanger and to cause the refrigerant flowing out of the exterior heat exchanger to the refrigerant suction port of the ejector, in the other one operation mode of the cooling operation mode and the heating operation mode.

9. The refrigerant cycle device according to claim 8, further comprising
an inner heat exchanger configured to perform a heat exchange between the refrigerant flowing out of the heat exchanger operated as the radiator and the refrigerant to be drawn into the compressor in the one operation mode.

10. The refrigerant cycle device according to claim 8, wherein the one operation mode is the cooling operation mode.

11. The refrigerant cycle device according to claim 8, wherein the ejector is located outside the space.

12. The refrigerant cycle device according to claim 8, wherein the using-side heat exchanger is located at an upper side of the exterior heat exchanger.

13. The refrigerant cycle device according to claim 8, wherein the using-side heat exchanger has a heat-exchanging capacity that is smaller than that of the exterior heat exchanger.

* * * * *